United States Patent
Tandia et al.

(10) Patent No.: US 10,607,331 B1
(45) Date of Patent: Mar. 31, 2020

(54) IMAGE SEGMENTATION INTO OVERLAPPING TILES

(71) Applicant: Corning Incorporated, Corning, NY (US)

(72) Inventors: Adama Tandia, Nelson, PA (US); Yi Zhang, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/456,733

(22) Filed: Jun. 28, 2019

(51) Int. Cl.
*G06T 7/00* (2017.01)
*G06K 9/62* (2006.01)
*G06T 7/11* (2017.01)

(52) U.S. Cl.
CPC .......... *G06T 7/0002* (2013.01); *G06K 9/6267* (2013.01); *G06T 7/11* (2017.01); *G06T 2200/24* (2013.01); *G06T 2207/20081* (2013.01); *G06T 2207/20084* (2013.01)

(58) Field of Classification Search
CPC ......... G06T 7/0004; G06T 2207/30108; G06T 7/0002; G06T 2207/20021; G01N 21/956; G06K 2209/19
See application file for complete search history.

(56) References Cited

U.S. PATENT DOCUMENTS

| | | | |
|---|---|---|---|
| 5,347,591 A * | 9/1994 | Onishi | G06K 9/03 382/147 |
| 5,684,890 A * | 11/1997 | Miyashita | G06T 7/70 382/154 |
| 5,754,709 A * | 5/1998 | Moriya | G06T 7/12 358/461 |
| 7,590,277 B2 * | 9/2009 | Oaki | G06T 7/001 382/141 |
| 8,488,863 B2 * | 7/2013 | Boucheron | G06K 9/0014 382/131 |
| 2005/0286753 A1 * | 12/2005 | Ho | G06T 7/001 382/141 |
| 2006/0280363 A1 * | 12/2006 | Umeda | G06K 9/0061 382/167 |
| 2008/0178288 A1 * | 7/2008 | Alperovitch | H04L 63/0227 726/22 |
| 2011/0075914 A1 * | 3/2011 | Filkins | G06K 9/00127 382/133 |

(Continued)

FOREIGN PATENT DOCUMENTS

CN 107316066 A 11/2017

*Primary Examiner* — Gandhi Thirugnanam

(57) ABSTRACT

Systems and techniques for image segmentation into overlapping tiles are described herein. In an example, an anomaly detection system for super-high-resolution images is adapted to divide the image into tiles with a size and overlap between each tile, wherein the size and overlap is determined using a machine-learning model. The anomaly detection system may be further adapted to use a classifier model for each tile to identify anomaly presence in the tile, wherein the classifier model is trained using a data set of tile size images that are labeled according to anomaly presence in each tile size image. The anomaly detection system may be further adapted to determine a classification for the image based on results from the classifier model for the tiles. The anomaly detection system may be further adapted to output the classification.

20 Claims, 12 Drawing Sheets

(56) References Cited

U.S. PATENT DOCUMENTS

| | | | | |
|---|---|---|---|---|
| 2011/0255741 A1* | 10/2011 | Jung | ................. | G06K 9/00369 |
| | | | | 382/103 |
| 2015/0022525 A1* | 1/2015 | Grenfell | ............... | G06T 15/005 |
| | | | | 345/427 |
| 2015/0186953 A1* | 7/2015 | Gross | ................. | G06F 16/5838 |
| | | | | 705/14.58 |
| 2016/0371546 A1* | 12/2016 | Yadav | ................. | H04N 5/7605 |
| 2017/0256051 A1* | 9/2017 | Dwivedi | ................... | G06T 7/11 |

\* cited by examiner

US 10,607,331 B1

IMAGE SEGMENTATION INTO OVERLAPPING TILES

TECHNICAL FIELD

Embodiments described herein generally relate to image analysis. Embodiments described herein generally relate to identifying product defects through image analysis and, in some embodiments, more specifically to using a neural network to optimize the analysis process.

BACKGROUND

During the production and manufacture of products, defect may result. In many of today's high precision products, these defects may be difficult to detect, but still incredibly detrimental if not identified and removed. Products such as precision mesh screens used in chemical manufacture or silicon wafers for semiconductor are two examples. One method for detecting these defects is through the use of image analysis. A defect or anomaly may be any type of abnormality to the consistency or of the intended design of the product. A picture of the product is taken and then analyzed to determine any abnormalities with the product. While this method has proved to be successful, it requires the images to be of a very high resolution for the defects to be detectable. Thus, the analysis of such high-resolution images may be very time consuming and processing heavy to complete.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
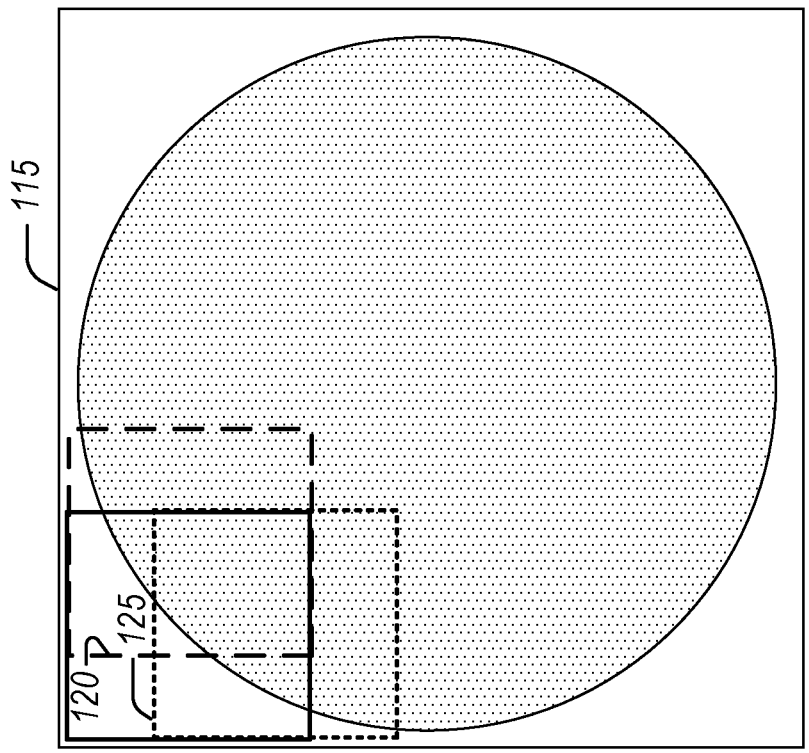
FIG. 1 illustrates an image of a product with an example of tile and overlap applied, in accordance with some embodiments.
Figure 1:
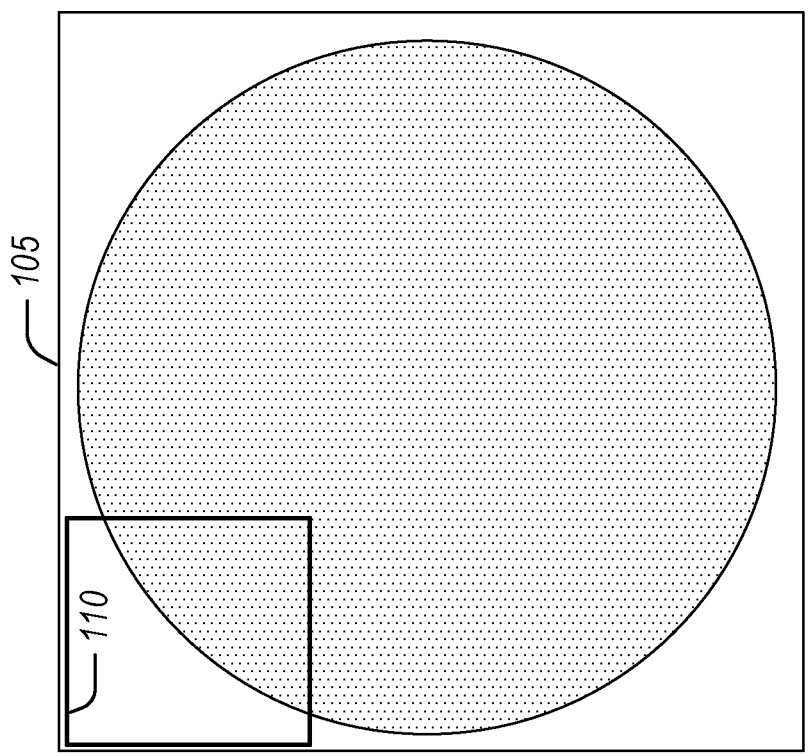

Identifying defects of products using high-resolution and super-high-resolution images may be a classification process using types of machine-learning such as a convolution neural network (CNN). The machine-learning model or neural network is trained to identify certain types of images that are deemed as relating to defective products. CNN is a subset of Machine Learning algorithms that is used for image classification. CNN typically requires a large number (tens or hundreds of thousands) of images, where the images may have resolutions of different sizes depending on the application. Typical resolution can be varying from few pixels to many thousand pixels. CNN has widespread in many different applications, from face recognition methods to product defect recognition for quality control. The required minimal resolution of the images are application dependent.

For many industrial applications, the number of images collected from experiments are limited and each single image may have a super-high resolution (e.g., greater than 5000×5000 pixels) which may be beyond the calculation capability of a classical CNN method on regular desktop computers. Because of the limitation of the number of images, it is difficult to build a CNN model from scratch. A CNN model is made with different layers. The deeper layers, the convolutional layers (CL), serve the purpose of extracting key features that are characteristics of each image. The top or last layers connected to the output layer are classical multi-layer-perceptron (MLP) neural networks which use the extracted features from the deep CL as inputs. For cases with a large number of images, both the CL and the MLP layers may be trained simultaneously from scratch or from pretrained models. However, with a reasonable number of images, only the upper layers (MLP) may be trained of a pre-trained CNN model.

To accommodate current CNN algorithms which may choke on a large number of images with high resolution, some approaches suggest reducing the resolution of the images. Unfortunately, this results in the CNN model accuracy becoming very low, mostly due to the defect signature being lost with the reduction of the image resolution. Thus, the super-high-resolution of the image must be maintained to detect the defect, but building and running a model with limited super-high-resolution images presents challenges.

The methods and techniques discussed herein attempt to overcome these two challenges with an image cropping methodology to create smaller pieces of the original images and populate the dataset. Instead of feeding the entire image as an array of numbers, the image is broken up into a large number of tiles which are large enough to contain all the key features of the different classes of defects of an original image. The problem is no longer to classify images as belonging to a given class, but rather to classify the tiles into the defined classes.

The methods and techniques discussed herein detect defects present on super-high-resolution images without losing image features' information through resolution rescaling. The methods and techniques use an 'overlapped-step-by-step' process to crop the original images and generate many sub-images (tiles) to ensure all the features are included in the new image model database and each tile is large enough to possibly contain all features representing the different possible characteristics (defects) to be classified.

Additionally, each tile has a resolution small enough for efficient memory processing and large enough to uniquely differentiate the different characteristics to be classified. By breaking up a whole image into a given number of tiles, the total number of image data is also increasing which can solve the problem of lacking data, so that the model can be built from scratch with sufficient data.

Dividing the super-high-resolution images into smaller tiles for analysis and classification solves the problem of having to analyze and classify all of the super-high-resolution image at one time. However, it presents a new problem in determining the size of tile. Additionally, depending on the content of the image and the type of defect, if a defect were to present on the edge between two tiles then it may be undetected by the classifier as the portion appearing in each respective tile would not fall into the known defects of the CNN. Thus, a tile overlap is utilized to ensure a defect is not missed by being split along tile edges. Along with determining the tile size, the overlap size is determined.

First, an appropriate tile and overlap size is determined for the type of application such that the tile and overlap size is large enough to capture defects within a single tile. Second, an appropriate tile and overlap size is determined to optimize the processing and time required to classify a whole image. Tile and overlap sizes that are too large or too small may result in excess analysis being required and thus losing the benefit of dividing the image into tiles.

For example, if a tile size is selected that is excessively large, then the advantages of the super-high-resolution image division into tiles may be lost as each large tile still consumes a large amount of time to analyze and classify. On the other hand, tiles that are too small may not fully capture the defects and result in missed defects. Similarly, if an overlap is selected that is too large, excessive analysis of the same image area may result.

The methods and techniques further describe herein using a machine learning model to determine the optimal tile size and tile overlap to detect defects and provide efficient processing of the super-high-resolution image. The methods and techniques described herein may be used for various types of products and the respective super-high-resolution images, and detecting many types of anomalies, both good and bad, in those images. For each different application, the content of the super-high-resolution images may differ and the size and type of anomalies may differ accordingly. Thus, the optimal tile size and overlap will differ with each application. This prompts the need for the use of a CNN classifier for identification of the anomalies, and the machine learning model to determine the optimal tile size and overlap.

FIG. 1 illustrates an image of a product with an example of tile and overlap applied, in accordance with some embodiments. Image 105 of a product, such as a ceramic based filter, is a super-high-resolution image, such as 16000 by 16000 pixels. Using information, such as the size of the defect and processing required for analyzing a tile segment, a tile 110 is determined. The whole image 105 is then divided into tile 110 size images for analysis. To prevent an anomaly or defect from being missed by falling on the edge between two tiles, an overlap is also determined. For image 115, the original tile 110 is shifted to the right as tile 120 which overlaps with tile 110. Additionally, the overlap occurs as tiles move down the image 115. For example, the original tile 110 is shifted downward as tile 125 which overlaps with tile 110. Such shifting may occur across and down the image 115 with each consecutive tile having an overlap similar to tile 110 and tile 120 or tile 110 and tile 125. The overlap may be the overlap in both the horizontal and vertical direction. The horizontal overlap may be different than the vertical overlap.

Figure 2:
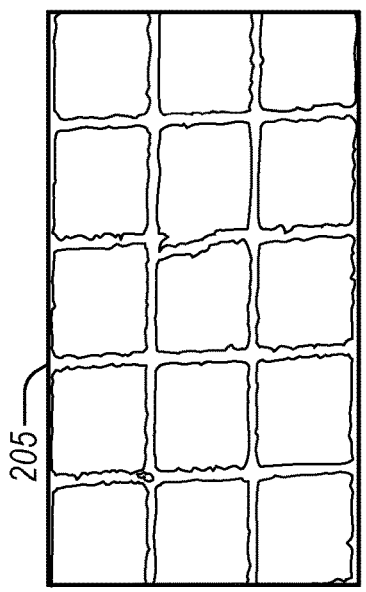
FIG. 2 illustrates a tiling example, in accordance with some embodiments.
Figure 2:
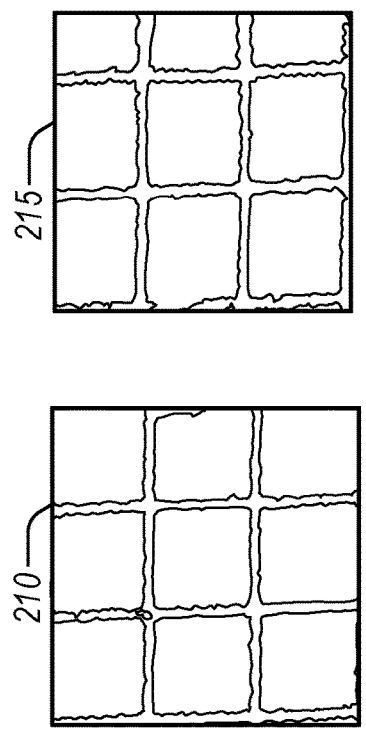

FIG. 2 illustrates a tiling example 200, in accordance with some embodiments. In the example 200, section 205 is a sample area of a super-high-resolution image, such as image 105. Section 205 includes a defect as a vertical portion of the filter mesh is malformed and may potentially break, leading to malfunction of the filter. Using tiling, without overlap, to divide the overall image into smaller sub-images for analysis may result in tile 210 and tile 215. However, by not including an overlap, the defect may be split between the right edge of tile 210 and the left edge of tile 215. This split may leave an insufficient amount of the defect in either tile for a CNN to recognize the defect. Thus, the CNN may mis-classify the image with section 205 as passing, when there is actually a defect with the product.

Figure 3:
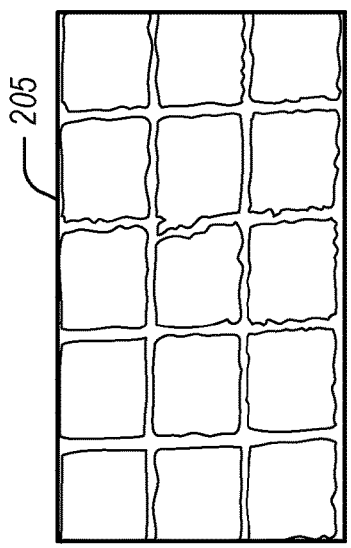
FIG. 3 illustrates a tiling example, in accordance with some embodiments.
Figure 3:
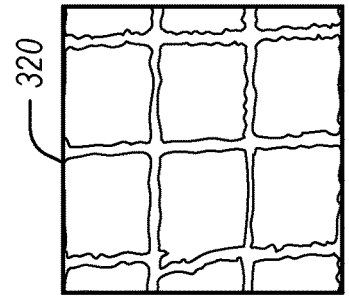
Figure 3:
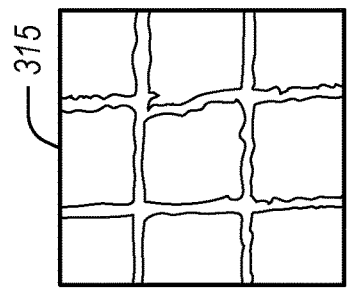
Figure 3:
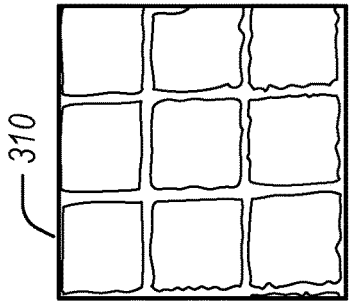

FIG. 3 illustrates a tiling example 300, in accordance with some embodiments. In example 300, section 205 includes a defect as a vertical portion of the filter mesh is malformed and may potentially break, leading to malfunction of the filter. Using tiling, with overlap, to divide the overall image into smaller sub-images for analysis may result in tile 310, tile 315, and tile 320. By using an overlap, the defect is fully captured in tile 315. There is a sufficient amount of the defect present in tile 315 for the CNN to recognize the defect and classify tile 315. This may result in appropriate classification of failing for the image with section 205.

The determination of an optimal tile size and overlap (or step) size is application dependent. For example, the tile size and overlap may be different for the content of the image (e.g., a mesh, semiconductor wafer, flat glass sheets) and the anomaly or defect that is being identified. For each application, a pre-process is performed with a training set of super-high-resolution images and identified anomalies to determine the optimal tile size and overlap. A range for the size of the tiles and for the pixels in the step may be defined. The model development follows then the steps in the flowchart described in FIG. 4.

When building a model, the model may be a good model or it may be a bad model. A good model is one that makes close to accurate predictions, while a bad model is one that does not make very accurate predictions. The accuracy of a model is determined by providing input to the model with known values and comparing the predicted values to the known values. These values may be laid out in a confusion matrix. In the field of machine learning for classification, a confusion matrix is a specific table layout that allows visualization of the performance of a classification model. Each row of the matrix represents the instances in a predicted class while each column represents the instances in an actual class (or vice versa), which then makes it easy to assess if the model is confusing two classes (i.e. commonly mislabeling one as another).

Using the tile images as an example, the defect identification model may be provided a set of tiles or sub-images with some of the sub-images including defects, and which tiles have defects is known. The accuracy of the defect identification model is determined by how accurate the defect identification model identifies which sub-images include a defect and which sub-images do not.

The accuracy of a model is also known as $R^2$. The closer $R^2$ is to 1, the more accurate the model. With a binary system such as the defect identification, $R^2$ is calculated by the dividing the number of correct prediction by the total number of items in the sample set. For example, if the model is provided 10 samples and accurately predicts 8 of them, then the $R^2$ is 0.8.

Figure 4:
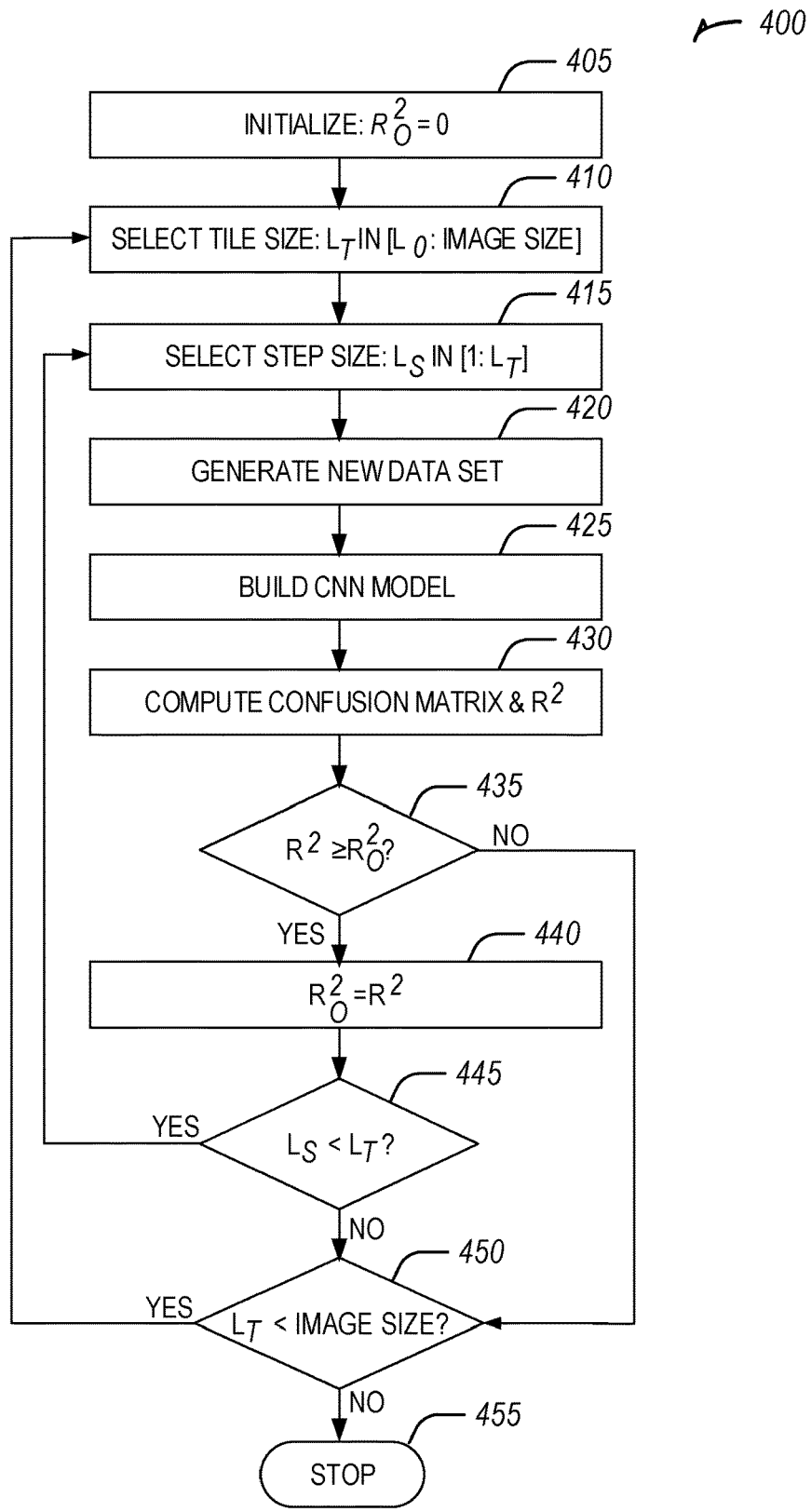
FIG. 4 illustrates a flowchart for determining the tile size and overlap for a set of super-high-resolution images, in accordance with some embodiments.

FIG. 4 illustrates a flowchart 400 for determining the tile size and overlap for a set of super-high-resolution images, in accordance with some embodiments. To identify an optimal tile size and overlap, the accuracy, or $R^2$, is used as an evaluation marker. When $R^2$ is no longer improving, then the optimal tile size and overlap has been identified. Thus, the process starts with operation 405 to initialize $R^2_O$ to 0, with $R^2_O$ being the optimal $R^2$. The tile size and overlap are then selected. At operation 410, a tile size is selected ranging from the smallest tile size possible to the size of the image. The smallest tile size possible may be the smallest size that captures an anomaly. Then at operation 415, a step size or overlap is selected, which may range from 1 pixel to the size of the current tile.

At operation 420, a new data set is generated. This may include taking a set of super-high-resolution images with identified anomalies and splitting the images based on the currently selected tile size and step size from operation 410 and operation 415. The resulting sub-images from the split are then labeled according to the presence of an anomaly. At operation 425, the new data set is used to train and build a CNN model based the current tile size and step size.

At operation 430, the CNN model is used to generate a confusion matrix. A set of sub-images, which include sub-images both with and without anomalies, are input to the CNN model. The CNN model classification is then compared with the known classification, such as with a confusion matrix. The comparison provides an $R^2$ for the CNN model based on the current tile size and step size.

At decision 435, the $R^2$ value is compared to the $R^2_O$, where if the $R^2$ value is greater than or equal to the $R^2_O$ then at operation 440, the $R^2_O$ value is replaced with the current $R^2$. If the $R^2$ is not greater than or equal to the $R^2_O$ value, then operation is advanced to decision 450.

After operation 440, at decision 445, it is determined if the step size smaller than the current tile size. If the step size is smaller than the current tile size, then there is the potential having a larger step size will produce better classification results, and operation is returned to operation 415 where the step size is increased and the process to calculate $R^2$ with a new data set with the increased step size is repeated.

At decision 445, if the step size is not less than the tile size, then operation moves to decision 450. At decision 450, the tile size is compared to the image size. If the tile size is smaller than the image size, then operation is returned to operation 410 where the tile size is increased, as a larger tile size may produce better classification results. At decision 450, when the tile size approaches the size of the image and is no longer smaller than the image, then the operations end at operation 455.

In general, the flowchart 400 uses the convergence of $R^2$ to determine an optimal tile size and step size. When the accuracy, or $R^2$ no longer improves, then the cost (e.g., processing power, processing time) of larger tile sizes and step sizes is lost. By performing the operations of flowchart 400 for an application (i.e., a set of super-high-resolution images and respective anomalies for the set of super-high-resolution images), an optimal tile size and step size may be determined for the CNN model which results in a more accurate classification of images for the given application.

In a different approach to obtain the optimal tile size and overlap size, the two variables of tile size and overlap size may be fed into the model development with the use of hyper-parameter optimization methods, such as Bayesian Optimization. To identify the optimal size for the tiles and the size of the overlap, all the features of the original super-high-resolution images should be contained in these split sub-images or tiles. Because the sub-images are overlap-split, all the features of original image may be captured in different patterns, but this results in an increase in the number of images in the dataset. For both methods, the optimal choice for the tile and overlap are defined for a maximal value of the $R^2$ on the validation set (goodness of fit). Once the maximum values for the tile size and the overlap are defined, either a random search, a grid search or an optimization method may be used to find the optimal set ($N_{opt}, S_{opt}$) that maximizes the $R^2$ on the validation set.

A random search may include defining the limits for both variables, and a pair ($N_i, S_i$) is randomly selected and used in the model development with its corresponding $R^2$ recorded. After a large number of trials the best model is chosen to be the one that corresponds to the pair with the largest $R^2$ on the validation set.

A grid search may define the number of samples for each of the two variables. The finer the grid, the smaller the difference between two consecutive values for each variables, the larger the number the number of simulations to run. However, with a finer grid there is a higher probability to find an optimal $R^2$ for the validation set.

An optimization method, such as Bayesian Optimization, is an approach to optimizing objective functions that take a long time to evaluate. It builds a surrogate for the objective function $R^2$ and quantifies the uncertainty in that surrogate using a Machine Learning technique, such as Bayesian machine learning technique, or Gaussian process regression, and then uses an acquisition function defined from this surrogate to decide where to sample. The sample size is then narrowed to more potentially optimal samples for building the model.

Figure 5:
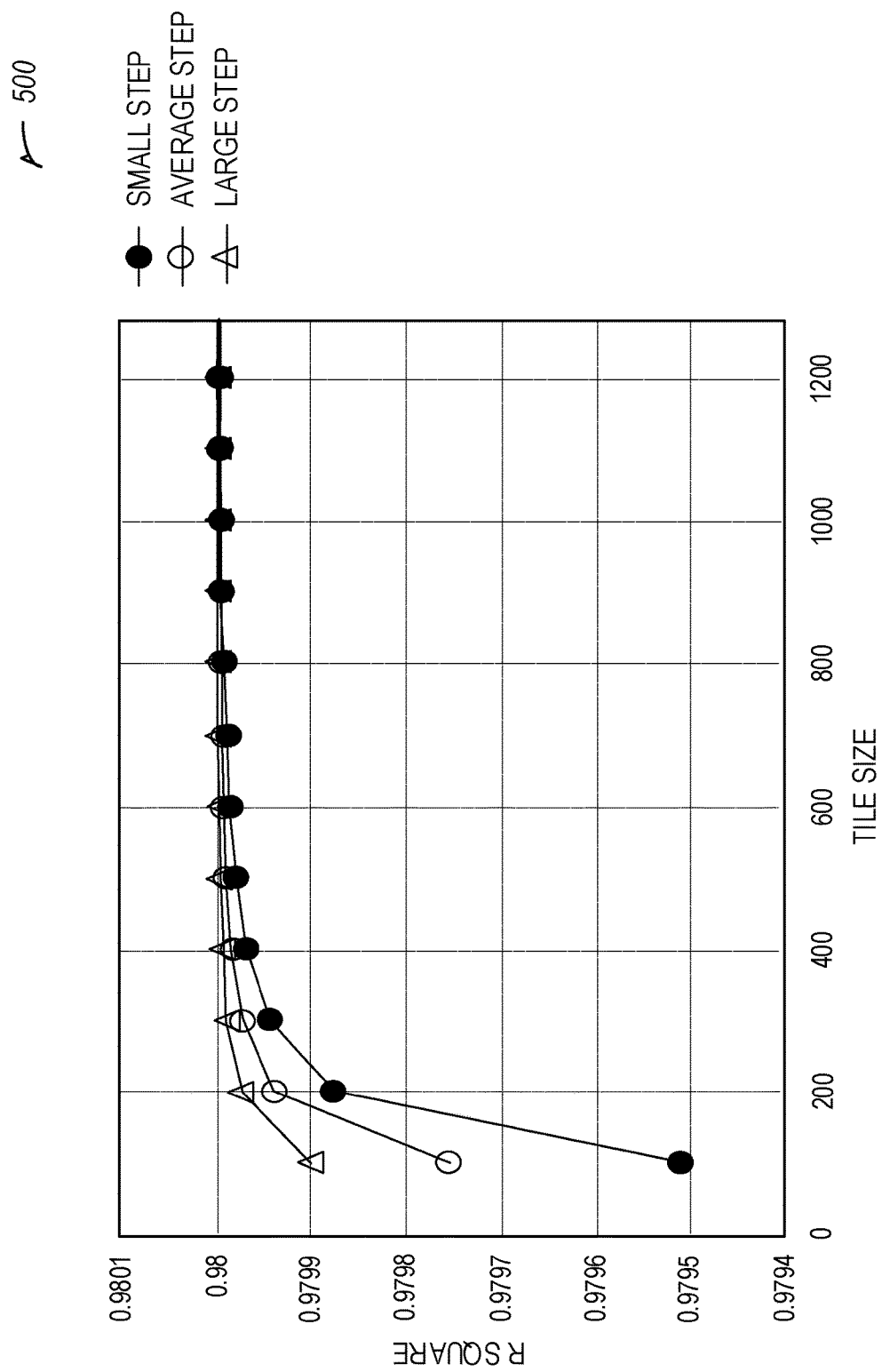
FIG. 5 is an example graph mapping the $R^2$ for tile size and step (overlap), in accordance to some embodiments.

FIG. 5 is an example graph 500 mapping the $R^2$ for tile size and step (overlap), in accordance to some embodiments. The graph 500 plots three lines for using a small step, an average step, and a large step, as the size of the tiles increases. For all size steps, the lines, or accuracy, converge as the tiles get larger. Smaller steps lead to slower convergence. Saturation of $R^2$ happens when tile is large enough to contain all possible characteristics to be classified.

While it may seem from the graph that a large step and larger tile size results is the better choice as the accuracy may be better, this is also balanced against the processing power and time required. A smallstep results in more tiles to be analyzed for a given super-high-resolution image. Additionally, a larger tile or sub-image will take longer to analyze than a smaller one. Thus, a balance must be found between accuracy ($R^2$) and the time and power required for that accuracy.

Figure 6:
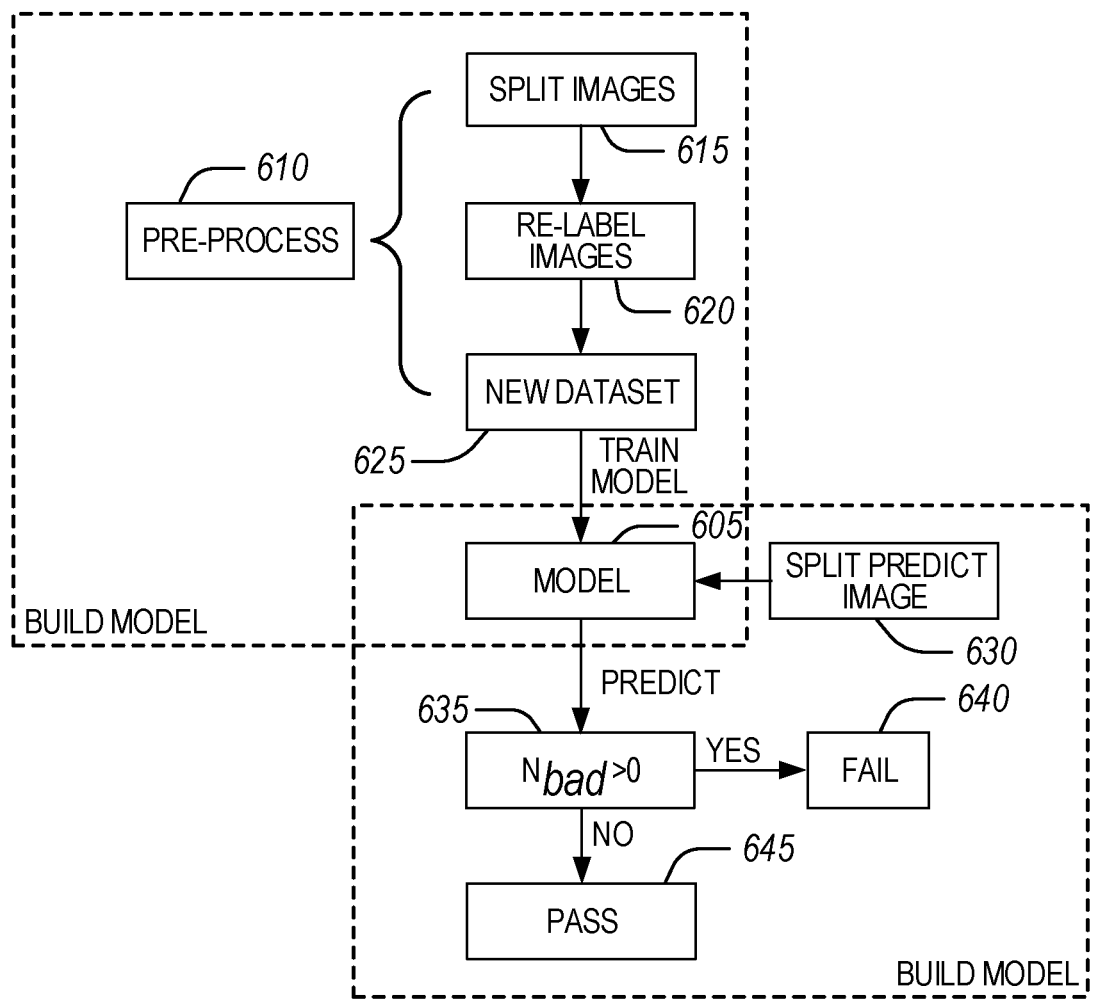
FIG. 6 illustrates an example of the training and prediction of the defect classification model, in accordance with some embodiments.

FIG. 6 illustrates an example 600 of the training and prediction of the defect classification model, in accordance with some embodiments. In the example 600, the tile size and overlap for the particular application of example 600 has already been determined. To build and train the model 605, a pre-process 610 occurs to create the dataset of images for training the model 605. The pre-process 610 includes splitting the super-high-resolution images 615 based on the tile size and overlap. The sub-images which are created from the splitting the super-high-resolution images 615 are relabeled 620. In other words, the sub-images are labeled as either including a defect or not including a defect. This results in a new dataset 625 of sub-images of tile size for training the model 605.

Once the model 605 is trained, an unknown super-high-resolution image may be classified. Using the predetermined tile size and overlap which was used for splitting the super-high-resolution images 615, the unknown super-high-resolution image is split 630. The set of sub-images for the unknown super-high-resolution images is provided to the model 605 and a prediction is made for each of the sub-images. The results of each sub-image is then evaluated 635. If the number of sub-images that were classified as being bad, or having a defect, is greater than 0 in the evaluation 635, then the unknown super-high-resolution image, and associated product, is classified as a fail 640. If none of the sub-images are classified as being bad in the evaluation 635, then the unknown super-high-resolution image, and associated product, is classified as passing 645.

Figure 7:
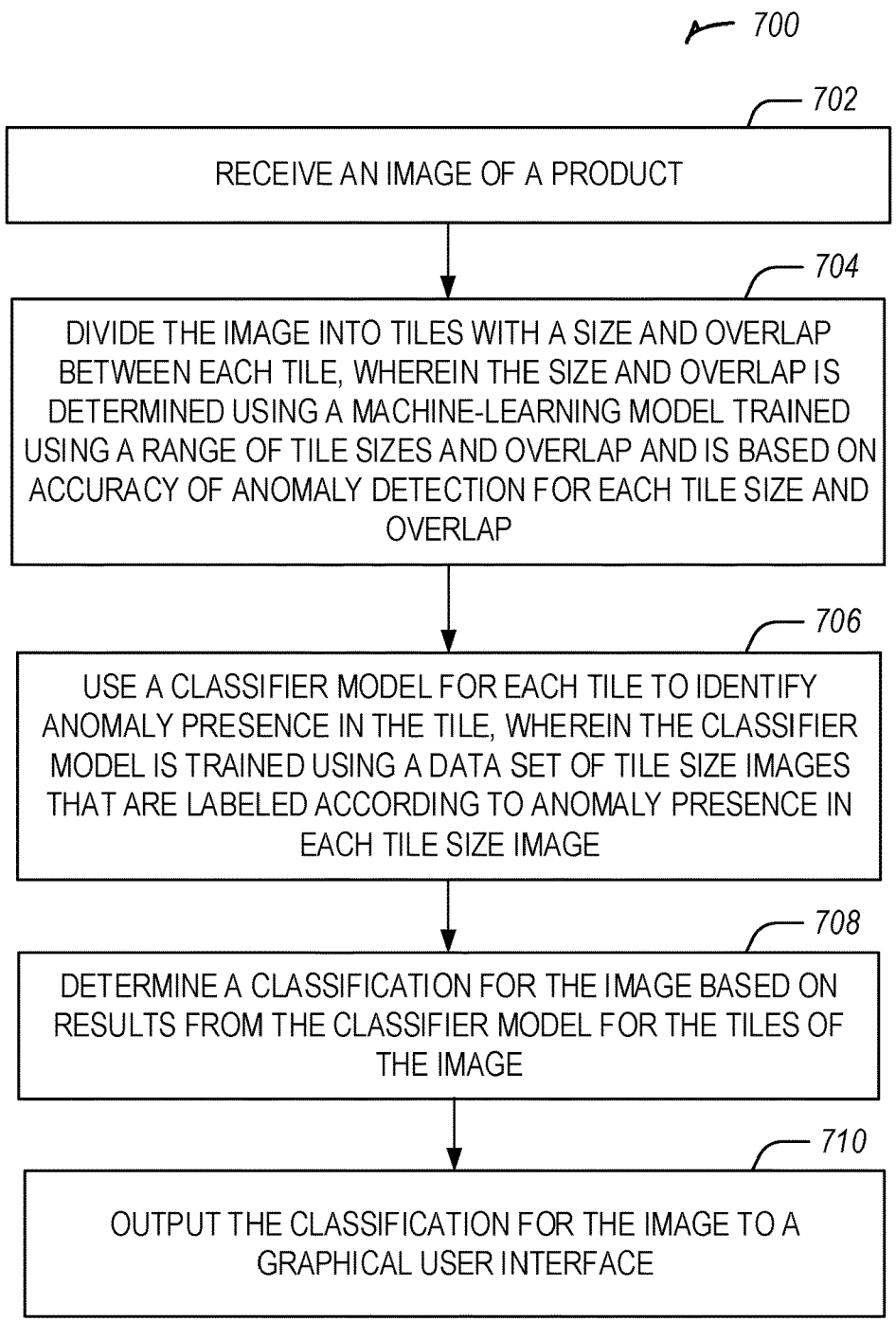
FIG. 7 illustrates a flowchart showing a technique for anomaly detection in a super-high-resolution image, in accordance with some embodiments.

FIG. 7 illustrates a flowchart showing a technique 700 for anomaly detection in a super-high-resolution image, in accordance with some embodiments. The technique 700 includes an operation 702 to receive an image, such as a super-high-resolution image, of a product. The super-high-resolution image may be a resolution of at least 5000 by 5000 pixels.

The technique 700 includes an operation 704 to divide the image into tiles with a size and overlap between each tile. The tile size and overlap may be determined using a machine-learning model trained using a range of tile sizes and overlap. The tile size and overlap may be based on accuracy of anomaly detection of the machine-learning model for each tile size and overlap. The range of tile sizes and overlap for training the machine-learning model may be based on one of random search, grid search, or Bayesian optimization. The machine-learning model may identify an optimal tile size and overlap based on a convergence of accuracy for tile size and overlap parameters.

The technique 700 includes an operation 706 to use a classifier model for each tile to identify anomaly presence in the tile. The classifier model may be trained using a data set of tile size images that are labeled according to anomaly presence in the tile size image. The data set of tile size images is generated by dividing a sample set of super-high-resolution images into tiles and labeling each tile based on anomaly presence within the tile. The tile size and overlap of the data set of tile size images is based on results of the machine-learning model.

For example, if a tile size of 200 by 200 pixels with an overlap of 50 pixels is determined by the machine-learning model to be the optimal tile size and overlap for anomaly detection with a respective application, then a data set of sub-images of size 200 by 200 pixels with a 50 pixel overlap is generated. The each sub-image in the data set is labeled as either including an anomaly or not including an anomaly and provided to the classifier model for training.

The technique 700 includes an operation 708 to determine a classification for the image based on results from the classifier model for the tiles of the image. The super-high-resolution image may be classified as passing when the anomaly presence is not identified for each of the tiles of the super-high-resolution image. The super-high-resolution image may be classified as failing when the anomaly presence is identified for at least one of the tiles of the super-high-resolution image.

The technique 700 includes an operation 710 to output the classification for the image to a graphical user interface. For example, a display may be connected to the computer system performing the classification. When classification of an image is completed, the display may provide information about the classification of the image, such as with text or a graphical indicator. The computer system execution the classification may be connected to a system which captures images of the products and includes a sorting mechanism. Based on the classification result, the sorting mechanism may move the product associated with the classified image to a particular bin. For example, a product that is classified as passing may be moved to bin for distribution or sales, while a product that is classified as failing may be moved to a bin of rejects for trash or recycling.

Figure 8:
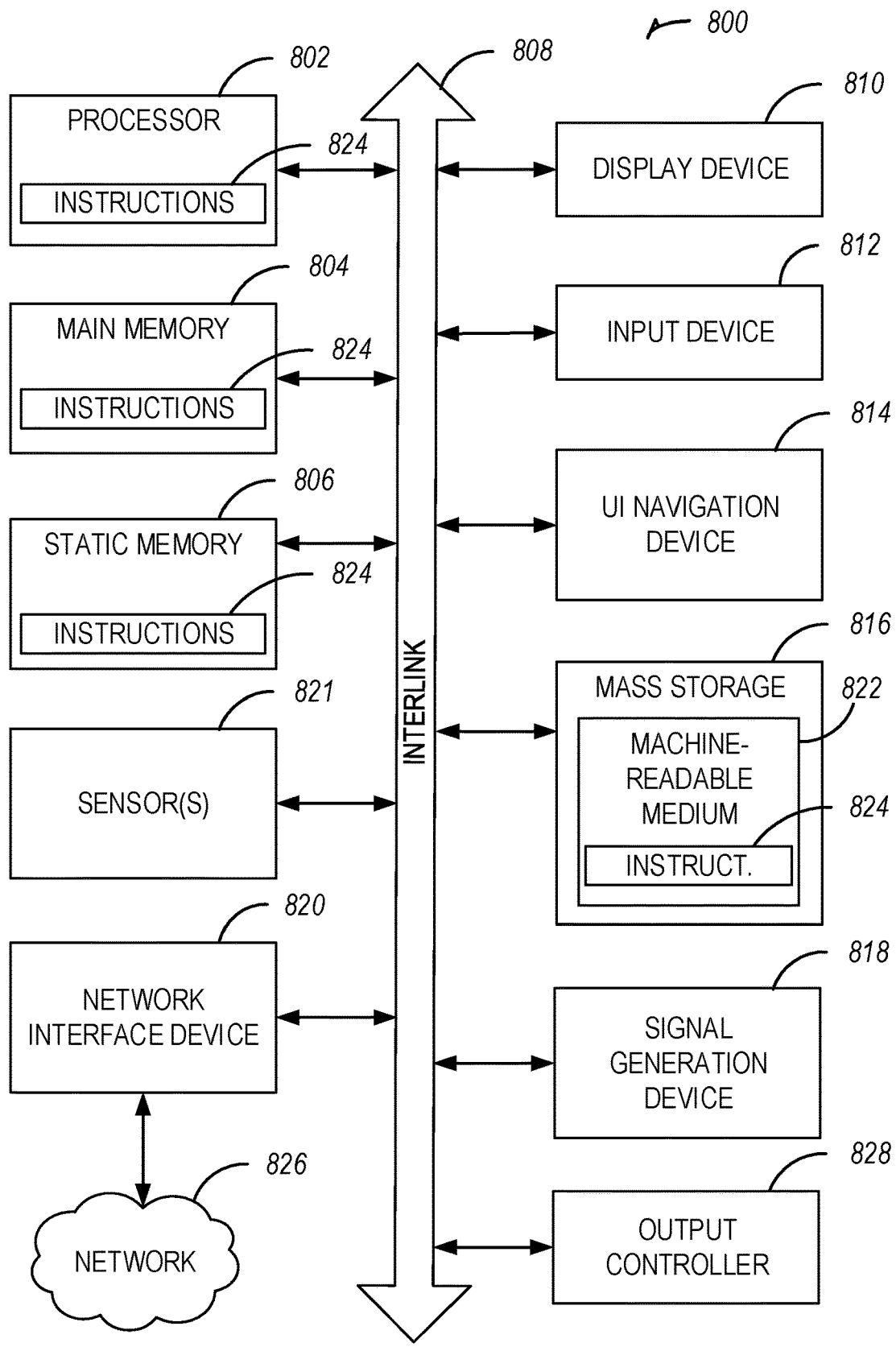
FIG. 8 is a block diagram illustrating an example of a machine upon which one or more embodiments may be implemented.

FIG. 8 illustrates a block diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 800 may include a hardware processor 802 (e.g., a central processing unit (CPU), a graphics processing unit (GPU), a hardware processor core, field programmable gate array (FPGA), or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or used by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

Figure 9:
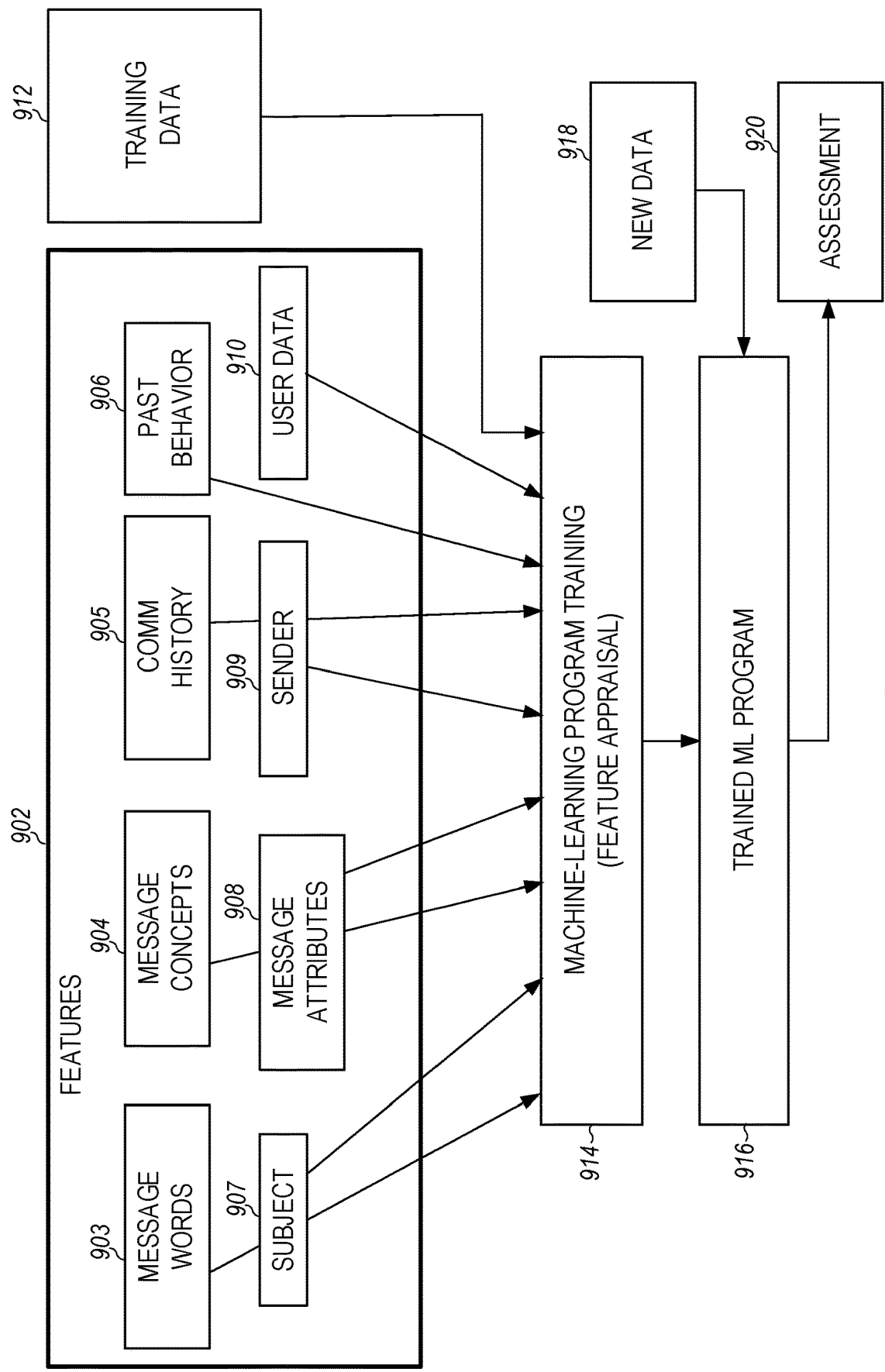
FIG. 9 illustrates the training and use of a machine-learning program, in accordance with some embodiments.

FIG. 9 illustrates the training and use of a machine-learning program, according to some example embodiments. In some example embodiments, machine-learning programs (MLPs), also referred to as machine-learning algorithms or tools, are utilized to perform operations associated with machine learning tasks, such as image recognition or machine translation.

Machine learning (ML) is a field of study that gives computers the ability to learn without being explicitly programmed. Machine learning explores the study and construction of algorithms, also referred to herein as tools, which may learn from existing data and make predictions about new data. Such machine-learning tools operate by building a model from example training data 912 in order to make data-driven predictions or decisions expressed as outputs or assessments 920. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, K nearest neighbor (KNN), Gaussian Process, Genetic Algorithm, Tree-based methods, kernel-based methods, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange). Regression algorithms aim at quantifying some items (for example, by providing a value that is a real number). The machine-learning algorithms utilize the training data 912 to find correlations among identified features 902 that affect the outcome.

The machine-learning algorithms utilize features 902 for analyzing the data to generate assessments 920. A feature 902 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 902 may be of different types and may include one or more of words of the message 903, message concepts 904, communication history 905, past user behavior 906, subject of the message 907, other message attributes 908, sender 909, and user data 910.

The machine-learning algorithms utilize the training data 912 to find correlations among the identified features 902 that affect the outcome or assessment 920. In some example embodiments, the training data 912 includes labeled data, which is known data for one or more identified features 902 and one or more outcomes, such as detecting communication patterns, detecting the meaning of the message, generating a summary of the message, detecting action items in the message, detecting urgency in the message, detecting a relationship of the user to the sender, calculating score attributes, calculating message scores, etc.

With the training data 912 and the identified features 902, the machine-learning tool is trained at operation 914. The machine-learning tool appraises the value of the features 902 as they correlate to the training data 912. The result of the training is the trained machine-learning program 916.

When the machine-learning program 916 is used to perform an assessment, new data 918 is provided as an input to the trained machine-learning program 916, and the machine-learning program 916 generates the assessment 920 as output. For example, when a message is checked for an action item, the machine-learning program utilizes the message content and message metadata to determine if there is a request for an action in the message.

Machine learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs and is evaluated over several epochs to more reliably provide the output that is specified as corresponding to the given input for the greatest number of inputs for the training dataset. In another example, for an unsupervised learning phase, a model is developed to cluster the dataset into n groups and is evaluated over several epochs as to how consistently it places a given input into a given group and how reliably it produces the n desired clusters across each epoch.

Once an epoch is run, the models are evaluated and the values of their parameters are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, Gaussian Process etc.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that it has not been trained on. In a second example, a false positive rate or false negative rate may be used to evaluate the models after finalization. In a third example, a delineation between data clusterings is used to select a model that produces the clearest bounds for its clusters of data.

Figure 10:
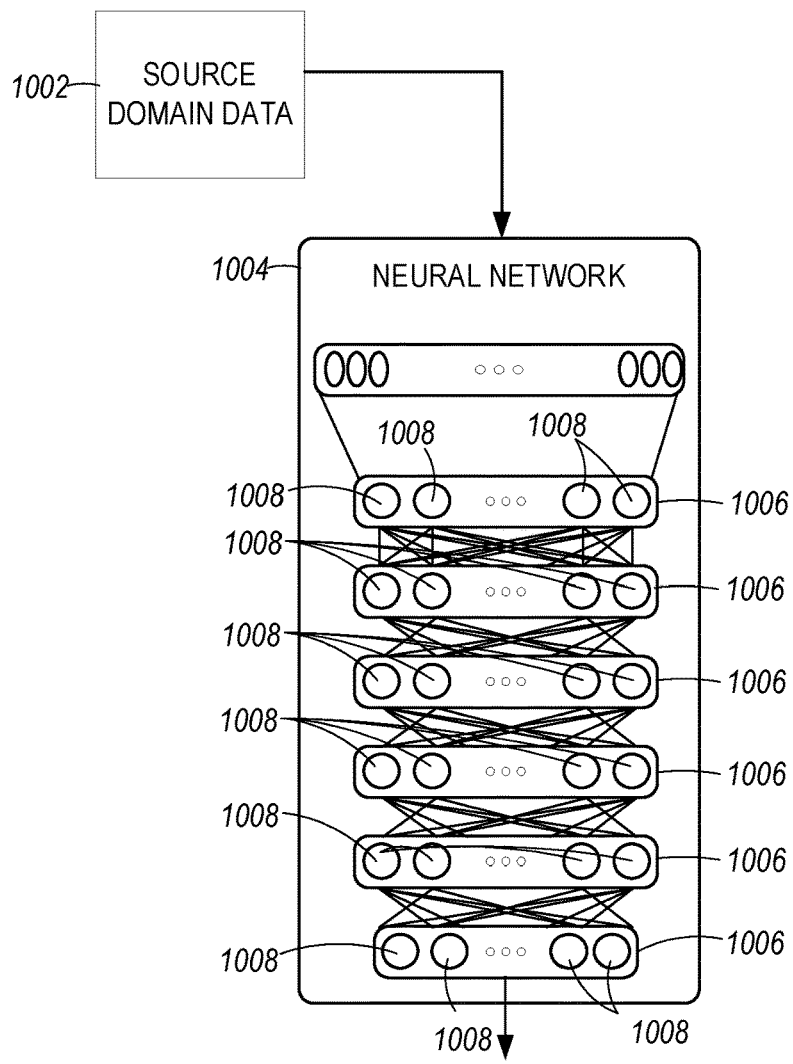
FIG. 10 illustrates an example neural network, in accordance with some embodiments.
Figure 10:
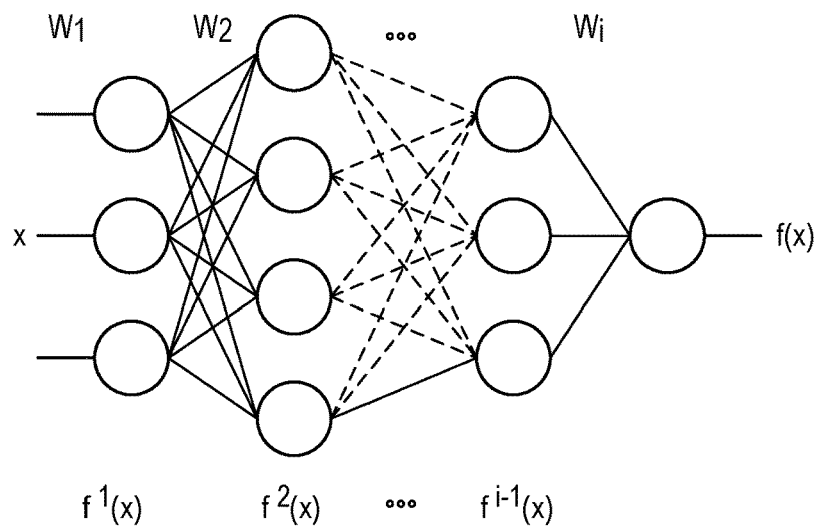

FIG. 10 illustrates an example neural network 1004, in accordance with some embodiments. As shown, the neural network 1004 receives, as input, source domain data 1002. The input is passed through a plurality of layers 1006 to arrive at an output. Each layer 1006 includes multiple neurons 1008. The neurons 1008 receive input from neurons of a previous layer and apply weights to the values received from those neurons in order to generate a neuron output. The neuron outputs from the final layer 1006 are combined to generate the output of the neural network 1004.

As illustrated at the bottom of FIG. 10, the input is a vector x. The input is passed through multiple layers 1006, where weights $W_1, W_2, \ldots, W_i$ are applied to the input to each layer to arrive a $f^1(x), f^2(x), \ldots, f^{i-1}(x)$, until finally the output f(x) is computed. The weights are established (or adjusted) through learning and training of the network. As shown, each of the weights $W_1, W_2, \ldots, W_i$ is a vector. However, in some embodiments, the each of the weights may be a scalar.

Neural networks utilize features for analyzing the data to generate assessments (e.g., recognize units of speech). A feature is an individual measurable property of a phenomenon being observed. The concept of feature is related to that of an explanatory variable used in statistical techniques such as linear regression. Further, deep features represent the output of nodes in hidden layers of the deep neural network.

A neural network, sometimes referred to as an artificial neural network, is a computing system/apparatus based on consideration of neural networks of biological brains. Such systems/apparatus progressively improve performance, which is referred to as learning, to perform tasks, typically without task-specific programming. For example, in image recognition, a neural network may be taught to identify images that contain an object by analyzing example images that have been tagged with a name for the object and, having learned the object and name, may use the analytic results to identify the object in untagged images. A neural network is based on a collection of connected units called neurons, where each connection, called a synapse, between neurons can transmit a unidirectional signal with an activating strength (e.g., a weight as shown in FIG. 10) that varies with the strength of the connection. The weight applied for the output of a first neuron at the input of a second neuron may correspond to the activating strength. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network, which is composed of multiple layers. The layers are composed of nodes, which are locations where computation occurs, loosely patterned on a neuron in the biological brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

Figure 11:
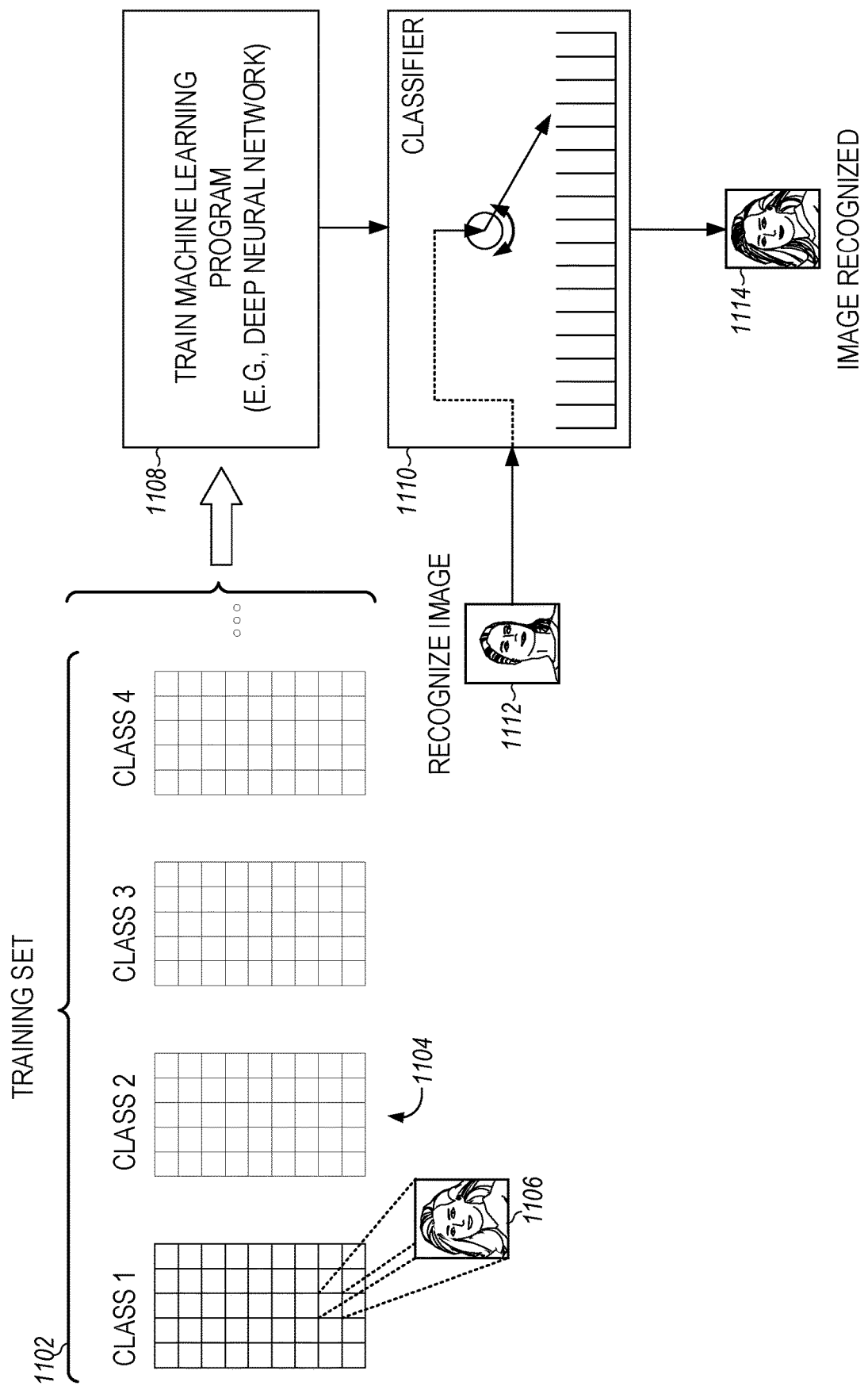
FIG. 11 illustrates the training of an image recognition machine learning program, in accordance with some embodiments.

FIG. 11 illustrates the training of an image recognition machine learning program, in accordance with some embodiments. The machine learning program may be implemented at one or more computing machines. Block 1102 illustrates a training set, which includes multiple classes 1104. Each class 1104 includes multiple images 1106 associated with the class. Each class 1104 may correspond to a type of object in the image 1106 (e.g., a digit 0-9, a man or a woman, a cat or a dog, etc.). In one example, the machine learning program is trained to recognize images of the presidents of the United States, and each class corresponds to each president (e.g., one class corresponds to George Washington, one class corresponds to Barack Obama, one class corresponds to Thomas Jefferson, etc.). At block 1108 the machine learning program is trained, for example, using a deep neural network. At block 1110, the trained classifier, generated by the training of block 1108, recognizes an image 1112, and at block 1114 the image is recognized. For example, if the image 1112 is a photograph of Bill Clinton, the classifier recognizes the image as corresponding to Bill Clinton at block 1114.

FIG. 11 illustrates the training of a classifier, according to some example embodiments. A machine learning algorithm is designed for recognizing faces, and a training set 1102 includes data that maps a sample to a class 1104 (e.g., a class includes all the images of purses). The classes may also be referred to as labels. Although embodiments presented herein are presented with reference to object recognition, the same principles may be applied to train machine-learning programs used for recognizing any type of items.

The training set 1102 includes a plurality of images 1106 for each class 1104 (e.g., image 1106), and each image is associated with one of the categories to be recognized (e.g., a class). The machine learning program is trained 1108 with the training data to generate a classifier 1110 operable to recognize images. In some example embodiments, the machine learning program is a DNN.

When an input image 1112 is to be recognized, the classifier 1110 analyzes the input image 1112 to identify the class (e.g., class 1114) corresponding to the input image 1112.

Figure 12:
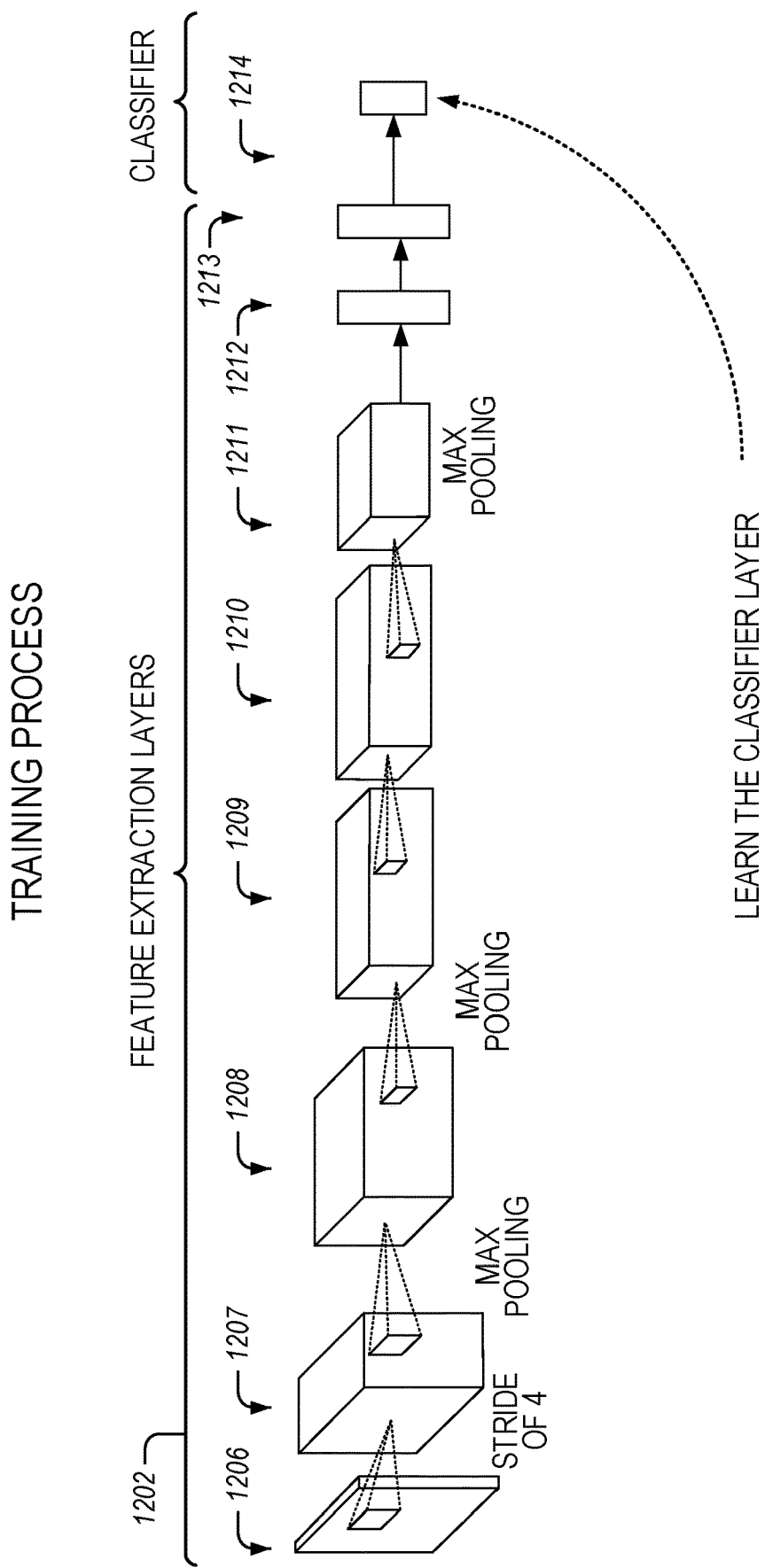
FIG. 12 illustrates the feature-extraction process and classifier training, in accordance with some embodiments.

FIG. 12 illustrates the feature-extraction process and classifier training, according to some example embodiments. Training the classifier may be divided into feature extraction layers 1202 and classifier layer 1214. Each image is analyzed in sequence by a plurality of layers 1206-1213 in the feature-extraction layers 1202.

With the development of deep convolutional neural networks, the focus in face recognition has been to learn a good face feature space, in which faces of the same person are close to each other and faces of different persons are far away from each other. For example, the verification task with the LFW (Labeled Faces in the Wild) dataset has been often used for face verification.

Many face identification tasks (e.g., MegaFace and LFW) are based on a similarity comparison between the images in the gallery set and the query set, which is essentially a K-nearest-neighborhood (KNN) method to estimate the person's identity. In the ideal case, there is a good face feature extractor (inter-class distance is always larger than the intra-class distance), and the KNN method is adequate to estimate the person's identity.

Feature extraction is a process to reduce the amount of resources required to describe a large set of data. When performing analysis of complex data, one of the major problems stems from the number of variables involved. Analysis with a large number of variables generally requires a large amount of memory and computational power, and it may cause a classification algorithm to overfit to training samples and generalize poorly to new samples. Feature extraction is a general term describing methods of constructing combinations of variables to get around these large data-set problems while still describing the data with sufficient accuracy for the desired purpose.

In some example embodiments, feature extraction starts from an initial set of measured data and builds derived values (features) intended to be informative and non-redundant, facilitating the subsequent learning and generalization steps. Further, feature extraction is related to dimensionality reduction, such as reducing large vectors (sometimes with very sparse data) to smaller vectors capturing the same, or similar, amount of information.

Determining a subset of the initial features is called feature selection. The selected features are expected to contain the relevant information from the input data, so that the desired task can be performed by using this reduced representation instead of the complete initial data without major loss of information. DNN utilizes a stack of layers, where each layer performs a function. For example, the layer could be a convolution, a non-linear transform, the calculation of an average, etc. Eventually this DNN produces outputs by classifier 1214. In FIG. 12, the data travels from left to right and the features are extracted. The goal of training the neural network is to find the weights for all the layers that make them adequate for the desired task.

As shown in FIG. 12, a "stride of 4" filter is applied at layer 406, and max pooling is applied at layers 1207-1213. The stride controls how the filter convolves around the input volume. "Stride of 4" refers to the filter convolving around the input volume four units at a time. Max pooling refers to down-sampling by selecting the maximum value in each max pooled region.

In some example embodiments, the structure of each layer is predefined. For example, a convolution layer may contain small convolution kernels and their respective convolution parameters, and a summation layer may calculate the sum, or the weighted sum, of two pixels of the input image. Training assists in defining the weight coefficients for the summation.

One way to improve the performance of DNNs is to identify newer structures for the feature-extraction layers, and another way is by improving the way the weights are identified at the different layers for accomplishing a desired task. The challenge is that for a typical neural network, there may be millions of weights to be optimized. Trying to optimize all these weights from scratch may take hours, days, or even weeks, depending on the amount of computing resources available and the amount of data in the training set.

Example 1 is a system for image analysis, comprising: at least one processor; and memory including instructions that, when executed by the at least one processor, cause the at least one processor to: receive an image of a product; divide the image into tiles with a size and overlap between each tile, wherein the size and overlap is determined using a machine-learning model trained using a range of tile sizes and overlap and is based on accuracy of anomaly detection for each tile size and overlap; use a classifier model for each tile to identify anomaly presence in the tile, wherein the classifier model is trained using a data set of tile size images that are labeled according to anomaly presence in each tile size image; determine a classification for the image based on results from the classifier model for the tiles of the image; and output the classification for the image to a graphical user interface.

In Example 2, the subject matter of Example 1 includes, wherein the image is classified as passing when the anomaly presence is not identified for each of the tiles of the image and wherein the image is classified as failing when the anomaly presence is identified for at least one of the tiles of the image.

In Example 3, the subject matter of Examples 1-2 includes, pixels.

In Example 4, the subject matter of Examples 1-3 includes, wherein the range of tile sizes and overlap for the machine-learning model is based on one of random search, grid search, or Bayesian optimization.

In Example 5, the subject matter of Examples 1-4 includes, wherein the data set of tile size images is generated by dividing a sample set of images into tiles and labeling each tile based on anomaly presence within the tile, and wherein size and overlap of the data set of tile size images is based on results of the machine-learning model.

In Example 6, the subject matter of Example 5 includes, wherein the sample set of images includes images with a plurality of anomalies, the plurality of anomalies being of different types and sizes.

In Example 7, the subject matter of Examples 1-6 includes, wherein the machine learning model identifies an optimal tile size and overlap based on a convergence of accuracy for tile size and overlap parameters.

Example 8 is a method for image analysis, comprising: receiving an image of a product; dividing the image into tiles with a size and overlap between each tile, wherein the size and overlap is determined using a machine-learning model trained using a range of tile sizes and overlap and is based on accuracy of anomaly detection for each tile size and overlap; using a classifier model for each tile to identify anomaly presence in the tile, wherein the classifier model is trained using a data set of tile size images that are labeled according to anomaly presence in each tile size image; determining a classification for the image based on results from the classifier model for the tiles of the image; and outputting the classification for the image to a graphical user interface.

In Example 9, the subject matter of Example 8 includes, wherein the image is classified as passing when the anomaly presence is not identified for each of the tiles of the image and wherein the image is classified as failing when the anomaly presence is identified for at least one of the tiles of the image.

In Example 10, the subject matter of Examples 8-9 includes, pixels.

In Example 11, the subject matter of Examples 8-10 includes, wherein the range of tile sizes and overlap for the machine-learning model is based on one of random search, grid search, or Bayesian optimization.

In Example 12, the subject matter of Examples 8-11 includes, wherein the data set of tile size images is generated by dividing a sample set of images into tiles and labeling each tile based on anomaly presence within the tile, and wherein size and overlap of the data set of tile size images is based on results of the machine-learning model.

In Example 13, the subject matter of Example 12 includes, wherein the sample set of images includes images with a plurality of anomalies, the plurality of anomalies being of different types and sizes.

In Example 14, the subject matter of Examples 8-13 includes, wherein the machine learning model identifies an optimal tile size and overlap based on a convergence of accuracy for tile size and overlap parameters.

Example 15 is at least one computer readable medium including instructions for image analysis that when executed by at least one processor, cause the at least one processor to: receive an image of a product; divide the image into tiles with a size and overlap between each tile, wherein the size and overlap is determined using a machine-learning model trained using a range of tile sizes and overlap and is based on accuracy of anomaly detection for each tile size and overlap; use a classifier model for each tile to identify anomaly presence in the tile, wherein the classifier model is trained using a data set of tile size images that are labeled according to anomaly presence in each tile size image; determine a classification for the image based on results from the classifier model for the tiles of the image; and output the classification for the image to a graphical user interface.

In Example 16, the subject matter of Example 15 includes, wherein the image is classified as passing when the anomaly presence is not identified for each of the tiles of the image and wherein the image is classified as failing when the anomaly presence is identified for at least one of the tiles of the image.

In Example 17, the subject matter of Examples 15-16 includes, wherein the range of tile sizes and overlap for the machine-learning model is based on one of random search, grid search, or Bayesian optimization.

In Example 18, the subject matter of Examples 15-17 includes, wherein the data set of tile size images is generated by dividing a sample set of images into tiles and labeling each tile based on anomaly presence within the tile, and wherein size and overlap of the data set of tile size images is based on results of the machine-learning model.

In Example 19, the subject matter of Example 18 includes, wherein the sample set of images includes images with a plurality of anomalies, the plurality of anomalies being of different types and sizes.

In Example 20, the subject matter of Examples 15-19 includes, wherein the machine learning model identifies an optimal tile size and overlap based on a convergence of accuracy for tile size and overlap parameters.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:
1. A system for image analysis, comprising:
   at least one processor; and
   memory including instructions that, when executed by the at least one processor, cause the at least one processor to:
      receive an image of a product;
      divide the image into tiles with a size and overlap between each tile, wherein the size and overlap is determined using a machine-learning model trained using a range of tile sizes and overlap and is based on accuracy of anomaly detection for each tile size and overlap;
      use a classifier model for each tile to identify anomaly presence in the tile, wherein the classifier model is trained using a data set of tile size images that are labeled according to anomaly presence in each tile size image;

determine a classification for the image based on results from the classifier model for the tiles of the image; and output the classification for the image to a graphical user interface.

2. The system of claim 1, wherein the image is classified as passing when the anomaly presence is not identified for each of the tiles of the image and wherein the image is classified as failing when the anomaly presence is identified for at least one of the tiles of the image.

3. The system of claim 1, wherein the image is a super-high-resolution image with a resolution of at least 5000 by 5000 pixels.

4. The system of claim 1, wherein the range of tile sizes and overlap for the machine-learning model is based on one of random search, grid search, or Bayesian optimization.

5. The system of claim 1, wherein the data set of tile size images is generated by dividing a sample set of images into tiles and labeling each tile based on anomaly presence within the tile, and wherein size and overlap of the data set of tile size images is based on results of the machine-learning model.

6. The system of claim 5, wherein the sample set of images includes images with a plurality of anomalies, the plurality of anomalies being of different types and sizes.

7. The system of claim 1, wherein the machine learning model identifies an optimal tile size and overlap based on a convergence of accuracy for tile size and overlap parameters.

8. A method for image analysis, comprising:

receiving an image of a product;

dividing the image into tiles with a size and overlap between each tile, wherein the size and overlap is determined using a machine-learning model trained using a range of tile sizes and overlap and is based on accuracy of anomaly detection for each tile size and overlap;

using a classifier model for each tile to identify anomaly presence in the tile, wherein the classifier model is trained using a data set of tile size images that are labeled according to anomaly presence in each tile size image;

determining a classification for the image based on results from the classifier model for the tiles of the image; and outputting the classification for the image to a graphical user interface.

9. The method of claim 8, wherein the image is classified as passing when the anomaly presence is not identified for each of the tiles of the image and wherein the image is classified as failing when the anomaly presence is identified for at least one of the tiles of the image.

10. The method of claim 8, wherein the image is a super-high-resolution image with a resolution of at least 5000 by 5000 pixels.

11. The method of claim 8, wherein the range of tile sizes and overlap for the machine-learning model is based on one of random search, grid search, or Bayesian optimization.

12. The method of claim 8, wherein the data set of tile size images is generated by dividing a sample set of images into tiles and labeling each tile based on anomaly presence within the tile, and wherein size and overlap of the data set of tile size images is based on results of the machine-learning model.

13. The method of claim 12, wherein the sample set of images includes images with a plurality of anomalies, the plurality of anomalies being of different types and sizes.

14. The method of claim 8, wherein the machine learning model identifies an optimal tile size and overlap based on a convergence of accuracy for tile size and overlap parameters.

15. At least one non-transitory computer readable medium including instructions for image analysis that when executed by at least one processor, cause the at least one processor to:

receive an image of a product;

divide the image into tiles with a size and overlap between each tile, wherein the size and overlap is determined using a machine-learning model trained using a range of tile sizes and overlap and is based on accuracy of anomaly detection for each tile size and overlap;

use a classifier model for each tile to identify anomaly presence in the tile, wherein the classifier model is trained using a data set of tile size images that are labeled according to anomaly presence in each tile size image;

determine a classification for the image based on results from the classifier model for the tiles of the image; and output the classification for the image to a graphical user interface.

16. The at least one non-transitory computer readable medium of claim 15, wherein the image is classified as passing when the anomaly presence is not identified for each of the tiles of the image and wherein the image is classified as failing when the anomaly presence is identified for at least one of the tiles of the image.

17. The at least one non-transitory computer readable medium of claim 15, wherein the range of tile sizes and overlap for the machine-learning model is based on one of random search, grid search, or Bayesian optimization.

18. The at least one non-transitory computer readable medium of claim 15, wherein the data set of tile size images is generated by dividing a sample set of images into tiles and labeling each tile based on anomaly presence within the tile, and wherein size and overlap of the data set of tile size images is based on results of the machine-learning model.

19. The at least one non-transitory computer readable medium of claim 18, wherein the sample set of images includes images with a plurality of anomalies, the plurality of anomalies being of different types and sizes.

20. The at least one non-transitory computer readable medium of claim 15, wherein the machine learning model identifies an optimal tile size and overlap based on a convergence of accuracy for tile size and overlap parameters.

* * * * *